United States Patent [19]

Chan et al.

[11] Patent Number: 5,435,930
[45] Date of Patent: Jul. 25, 1995

[54] DEICER/ANTI-ICER COMPOSITIONS FOR AIRCRAFT

[75] Inventors: Stephen K. Chan, Pinole; Gale L. Hubred, Brea; Harold E. Todd, Pinole, all of Calif.

[73] Assignee: General Atomics International Services Corporation, San Diego, Calif.

[21] Appl. No.: 218,732

[22] Filed: Mar. 28, 1994

[51] Int. Cl.$^6$ .............................................. C09K 3/18
[52] U.S. Cl. ....................................... 252/70; 252/74; 252/26; 252/75; 106/13
[58] Field of Search ....................... 106/13; 252/70, 74, 252/76, 75

[56] References Cited

U.S. PATENT DOCUMENTS

| | | | |
|---|---|---|---|
| 2,233,185 | 2/1941 | Smith | 252/76 |
| 3,928,654 | 12/1975 | Bonnanzio | 106/13 |
| 4,338,209 | 7/1982 | Manabe et al. | 252/75 |
| 4,377,488 | 2/1983 | Gancy | 252/70 |
| 4,606,835 | 8/1986 | Lieber et al. | 106/13 |
| 5,039,439 | 8/1991 | Haneman, Jr. et al. | 106/13 |
| 5,064,551 | 11/1991 | Smith | 252/79 |
| 5,127,954 | 7/1992 | Johnston et al. | 106/644 |
| 5,238,592 | 8/1993 | Stankowiak et al. | 252/70 |

FOREIGN PATENT DOCUMENTS 2054840 5/1992 Canada.

Primary Examiner—Karl Group
Assistant Examiner—C. M. Bonner
Attorney, Agent, or Firm—Fitch, Even, Tabin & Flannery

[57] ABSTRACT

Effective and environmentally benign liquid deicing and anti-icing compositions are provided by aqueous solutions of (a) alkali metal acetates, preferably KAc, (b) phosphate ion, e.g., $H_3PO_4$ or $K_3PO_4$, (c) soluble silicate, e.g., $K_2SiO_3$ or $Na_2SiO_3$, (d) aromatic triazole, preferably tolyltriazole, (e) a dye which provides a visible hue, and (f) a compatible surfactant which lowers the surface tension to below about 50 dynes per sq. cm., prevents aggregation of components (a) to (f), and assures excellent dispersion across aircraft surfaces, preferablty octylphenoxypolyethoxy ethylphosphate. These compositions are environmentally safe and are useful in methods for deicing or preventative anti-icing of aircraft that meet AEA, ISO and SAE aviation standards. These compositions remain effective at low temperatures and are non-corrosive to metals used in aircraft construction.

15 Claims, No Drawings

DEICER/ANTI-ICER COMPOSITIONS FOR AIRCRAFT

FIELD OF THE INVENTION

The present invention relates to deicing and anti-icing compositions suitable for use on the exterior of aircraft.

BACKGROUND OF INVENTION

Freezing rain and snow tend to accumulate as ice at a rapid rate especially on the wings of aircraft due to the heat capacity of metals used in their construction and the relatively flat surface which facilitates collection and crystallization. The airline industry, through unfortunate experiences, has become well aware of the critical fact that accumulated ice on an aircraft is extremely hazardous at takeoff due to the added weight and detraction from the aerodynamic lift of the wings. Therefore, an important safety factor in winter flight for the commercial airline industry, as well as in military operations, is the removal and prevention of ice formation from the exterior of aircraft.

Because deicing formulations used on aircraft are often ultimately washed into a storm drain system or a waterway, it is important that the composition be nontoxic go the environment, particularly aquatic life. It is also important that such deicing formulations be able to function well in a variety of weather conditions, both as deicer to remove accumulated ice and snow, and as an anti-icer, to prevent ice formation on aircraft. It is further important that such deicing formulations are not slippery; otherwise they could undesirably reduce the traction of the surface for aircraft and other vehicles.

Presently available ethylene glycol-based and methanol-containing commercial deicer formulations for the exterior of aircraft are toxic, corrosive to metals, slippery, and often flammable. Moreover, glycol-containing fluids are known to be damaging to the environment, to resist biological degradation, and to be toxic to humans and other animals.

There remains a need for effective, environmentally acceptable deicing solutions for use on aircraft, particularly wings, which are nontoxic, non-flammable, rapidly and visibly applicable, and essentially noncorrosive to the constructive metals of aircraft.

U.S. Pat. No. 2,233,185 to Smith discloses the use of alkali metal salts of formic, acetic, propionic, and butyric acids as antifreeze compositions and the inclusion of anti-corrosive agents, such as urea, arsenious oxide, chromates, and oils or emulsions, e.g. mineral oil, in such solutions. These solutions are not as effective as desired, and this level of anti-corrosiveness is no longer considered adequate for ordinary long-term use.

U.S. Pat. No. 5,064,551 to Smith discloses aqueous solutions of alkali metal acetates or alkali metal formates as deicing compositions that are alleged to be environmentally friendly and which include metal corrosion inhibitors. Disclosed are acetate and formate solutions which include potassium phosphate, sodium nitrite and EDTA. Although these compositions include some metal corrosion inhibitors, they include environmentally undesirable nitrites, and they are not presently considered to be environmentally acceptable or suitable for use as aircraft surface anti-icers.

It is an object of the present invention to provide effective aircraft surface deicers, particularly suitable for wing deicing, which can be easily applied, act quickly, are nonslippery, and are effective over a wide range of temperatures and weather conditions.

SUMMARY OF THE INVENTION

The present invention provides effective aircraft deicing and anti-icing liquid compositions which are non-flammable, non-slippery and are essentially noncorrosive to metals as well as environmentally benign. These liquid compositions are suitable for use in deicing aircraft exteriors, particularly wings. The compositions of the present invention are aqueous solutions of alkali metal acetates, which include phosphate ions, soluble silicates, preferably in the form of an alkali metal silicate, an aromatic triazole, a particularly effective and compatible surfactant, and a dye, and which have a pH of between about 10 and about 12.

DETAILED DESCRIPTION OF PREFERRED EMBODIMENTS

Unless defined otherwise, all technical and scientific terms used herein have the same meaning as is commonly understood by one of skill in the art to which this invention belongs.

As used herein, the term "deicer composition" refers to a composition which acts to remove ice from surfaces on which the ice has already formed. As used herein, the term "anti-icing composition" refers to a composition which is applied to a surface that is not yet covered with ice and is effective to prevent water on such surface from freezing to form ices.

The present invention provides liquid compositions which are effective both as deicing and anti-icing liquids. These compositions are easily applied, fast-acting, environmentally benign, nontoxic to humans, and essentially noncorrosive to metals. The compositions of the present invention contain an aqueous solution, with a pH of between about 10 and about 12, of an alkali metal acetate, preferably potassium acetate, a particularly effective water-soluble surfactant, preferably an octylphenoxy polyethoxy ethylphosphate, and a water-soluble dye in combination with at least one source of phosphate ion, preferably phosphoric acid, at least one water-soluble silicate, preferably sodium silicate, and an aromatic triazole, preferably tolyltriazole.

The compositions of the present invention contain between about 40% and about 60% weight of at least one alkali metal acetate in an aqueous solution. Alkali metal acetates include potassium acetate, sodium acetate, and lithium acetate, all of which are highly soluble in water. Preferred alkali metal acetates are potassium acetate and sodium acetate, which are readily commercially available. The most preferred alkali metal acetate is potassium acetate (KAc), which is soluble up to about 2000 grams per liter of water at room temperature. Preferred aqueous concentrations of potassium acetate are between about 50 and about 60 weight percent, which aqueous solutions advantageously have a depressed freezing point of about −40° C. or below.

The compositions of the present invention contain a relatively high amount, i.e. between about 500 parts per million (ppm) and about 1500 ppm, of a highly compatible water-soluble surfactant which not only reduces surface tension of the aqueous solution, but very importantly promotes excellent surface wettability and thorough dispersion of the deicer composition across the entire exterior surface of an aircraft. The surfactant should also promote homogeneity throughout the deicer/anti-icer composition by minimizing micelle formation and any aggregation of the molecular components in aqueous solution.

Generally, the lower the surface tension of a solution, the more likely it is that the solution will effectively wet the exterior surface of aircraft. A good wetting agent which will promote adequate dispersion upon contact with aircraft surfaces should preferably create an aqueous solution having a low surface tension, i.e. about 20 dynes/sq.cm. or below. Water and most ionic solutions have relatively high surface tensions, i.e. about 72 dynes/sq.cm. or higher. Ethylene glycol, the base for formulating most present-day commercial wing deicers, has a surface tension of about 50 dynes/sq.cm. As a result of the surfactant employed, aqueous compositions embodying features of the present invention have been formulated which not only have surface tensions well below 50 dynes/sq.cm but exhibit enhanced wetting and dispersion of such liquid deicers/anti-icers on exterior surfaces of aircraft, even in extreme weather conditions.

The preferred water-soluble surfactant is an anionic surfactant in the form of an alkyl aryl alkoxy phosphate ester, such as an octylphenoxy or a nonylphenoxy polyethoxy phosphate ethyl ester. The most preferred surfactant is the anionic surfactant octylphenoxypolyethoxy ethylphosphate which is available commercially in an 80% aqueous solution as TRITON QS-44® from Union Carbide, Danbury Conn. A particularly preferred composition of the deicer contains from about 800 to about 1200 ppm octylphenoxypolyethoxy ethylphosphate, and more preferably at least about 1000 ppm, at which levels the surfactant is completely soluble in water. It is feasible that such an anionic surfactant and a nonionic surfactant may be combined as co-surfactants in such a deicer/anti-icer composition. Examples of other water-soluble surfactants that might be used in combination include polyoxyethylene sorbitan monooleate (TWEEN 80®), polyoxyethylene sorbitan monostearate (TWEEN 60®), sulfosuccinate, sodium dodecyl sulfoacetate, sodium dodecyl sulfate, and the sodium salt of alkaryl polyether sulfonate.

The dye used is a water-soluble substance which imparts visible color to the deicer composition. The preferred compositions contain at least about 5 ppm of such a dye in order to render the deicer or anti-icer solution visible upon its application to aircraft exterior surfaces. One dye or a combination of dyes may be used in formulating the deicer compositions in order to yield a desired indicator color upon application to the exterior surfaces of aircraft. From an environmental standpoint, food dyes which are either natural substances or which appear on a list of synthetic FDA-approved U.S. Certified Food Colors are preferred because such dyes are harmless to the human system, environmentally safe, and readily available commercially. An example of one such dye is malonyl green, which might be used at a level of at least about 75 ppm and which is an azo dye that contains C.I. Acid Yellow 34 as an active ingredient. A preferred alternative green dye is a mixture of FD&C Yellow #5 and FD&C Blue #1, which is a triarylmethane, both of which are highly water-soluble. To provide a desirable green hue which is visually apparent on an aircraft surface, a mixture of about 5 to 10 ppm of the yellow dye and about 0.5 to 1.5 ppm of the blue dye, e.g. about 7 ppm Yellow #5 and about 0.8 ppm Blue #1, is preferably used.

Because these compositions are being used on aircraft, it is most important that they contain agents which act as corrosion inhibitors and add to the stability and homogeneity of the solutions in the particularly described combination. It has been found that a particular group of additives can be effectively employed in these compositions, which are environmentally safe, provide excellent metal corrosion protection for aircraft and do not detract from the stability and dispersability of the solutions. These agents in this combination are very effective at very low concentrations, that is, about 1.0 weight percent or less of the total composition containing about 50 weight percent KAc or the like. In addition to providing excellent metal corrosion protection, this particular combination of components retards biodegradation of the composition while enhancing the homogeneity and stability of the solution.

Included in the deicer/anti-icer compositions is one or more sources of water-soluble phosphate ion, which is present in final concentration in a quantity of at least about 800 parts per million (ppm), or 0.08 weight percent (1 part per million is equal to 0.0001 weight percent). Phosphate ion may be present at higher levels, such as about 10,000 parts per million (1.0 weight percent), or even up to the limits of its solubility, if desired; however such levels are considered unnecessary to achieve the desired effect. Preferably, phosphate ion is present in an amount of greater than about 500 ppm and less than about 10,000 ppm, and most preferably between approximately about 800 ppm and about 1200 ppm. Phosphate ions are preferably provided in the compositions of the present invention by the addition of alkali metal phosphates or phosphoric acid. Suitable alkali metal phosphates include sodium and potassium phosphates, and either may be used in the mono, di, and tri-basic form, which are all commonly commercially available. A suitable source of phosphate ion for use in the composition of the present invention is tribasic potassium phosphate ($K_3PO_4$), which is extremely soluble in water (up to approximately 43.7 weight percent in 0° C. water); about 2200 ppm of $K_3PO_4$ provides about 1000 ppm of phosphate ion. The preferred source of at least about 800 ppm, preferably 1000 ppm, water-soluble phosphate ion in compositions of the present invention is phosphoric acid ($H_3PO_4$) which is considered to be substantially completely ionized in such compositions.

Another component in the combination of the composition is a source of water-soluble silicate ions, preferably one or more alkali metal silicates. Soluble silicates should be present in final concentration in the deicing compositions at concentrations of at least about 150 ppm, and they may be present at substantially higher levels. Although soluble silicate is preferably provided by alkali metal silicates, it may also be provided by silicic acid, $H_4SiO_4$. Preferred soluble silicates are alkali metal silicates, particularly soluble sodium silicates and soluble potassium silicates.

Sodium silicates, known as water glass or soluble glass, are commonly available as a mixture of the forms $Na_2SiO_3$, $Na_6Si_2O_7$, and $Na_2Si_3O_7$. Some potassium silicates are known as soluble potash glass or soluble potash water glass, and mixtures of the forms $K_2Si_2O_5$ and $K_2Si_3O_7$, $K_2SiO_3$ are commercially available. Preferably either $Na_2SiO_3$, which in its anhydrous form is known as metasilicate, or $K_2SiO_3$ is used as the source of the soluble alkali metal silicates.

The soluble silicate additives are generally present in concentrations of at least about 150 ppm, preferably between about 150 ppm and about 250 ppm, and most preferably at about 200 ppm. However, soluble silicates may be present up to the limits of solubility of the silicate molecule, if desired for certain conditions.

Another component desirably included in the deicer/anti-icer composition is an aromatic azole. The aromatic azole component of the present compositions provides additional inhibition of surface corrosion and is considered to be particularly effective in the protection of aluminum and aluminum alloys in combination with the silicates. Preferred aromatic azoles include tolyltriazole, benzotriazole, and mercaptobenzothiazole. Aromatic triazoles are preferred and are desirably present in the deicer or anti-icer compositions at a level of at least about 100 ppm. The aromatic triazoles may be present at higher levels, e.g. at from about 700 ppm to about 1000 ppm, and can even be present up to the solubility limit of the component in the overall composition. The most preferred aromatic triazole is tolyltriazole, and tolyltriazole is preferably present at a level of from about 100 ppm to about 1000 ppm.

This particular combination of additives provides excellent resistance to corrosion and easily meets AMS standards for deicers. However, the compositions may, if desired for a particular application, have additional, optional additives which further inhibit surface corrosion. For example, monoethanol amine in a concentration between about 200 and about 600 ppm and/or diethanol amine in a concentration between about 300 and about 900 ppm and/or an aminoaromaticamide in a concentration between about 500 to about 1500 ppm may be optionally included.

The compositions of the present invention are preferably maintained within a pH range of about 10 to about 12. Generally, the pH of the final solution is adjusted to approximately 11, using the hydroxide of the alkali metal in the alkali metal acetate of the composition, e.g. KOH. A pH in this range contributes to the advantageous prevention of growth of bacteria and other microbes in the acetate solution; however, compositions having pH values lower than 10 are also effective for deicing and anti-icing.

The compositions of the present invention are visibly colored solutions, nonflammable and non-slippery, i.e. they do not reduce the traction of the pavement surrounding the aircraft. None of the ingredients of this composition are considered toxic to the environment or to human health. Because these compositions are non-hazardous, they may be transported and stored without special restrictions, and their storage containers may be disposed of in a normal landfill. Most importantly, these compositions readily break down in the natural environment without any significant adverse effects. The lack of toxicity and ability to biodegrade even at low temperatures is particularly important, for it is most likely that these deicing compositions will eventually be washed from the pavement surface into storm drains or directly into aquatic systems. Moreover, the composition is considered to have substantially lower Biological Oxygen Demand (BOD) requirements than comparable deicers.

The compositions of the present invention may be advantageously used both as a deicing liquid to remove ice from a surface or as an anti-icing liquid, for prevention of ice formation on a surface. As a deicing liquid, the amount required to effectively remove ice already formed on a surface is determined by both the ambient temperature and the quantity of ice present. The lower the air temperature, and the thicker the ice, the greater will be the amounts of deicing liquid required to sufficiently clear the surface of ice or snow; however, the composition exhibits an advantageously short thawing time. It is expected that these compositions will find primary applications as anti-icing compositions where the liquids are applied prior to any significant ice formation, in a concentration sufficient to prevent freezing and ice build-up along aircraft surfaces. A lesser amount of liquid is required to prevent ice formation than when necessary to first clear a surface of ice that has already formed. The concentration of anti-icer that is applied should be sufficient, following application completely across a surface, to prevent significant ice formation on that surface under reasonable conditions for at least about 60 minutes thereafter, at ambient air temperatures slightly below freezing, e.g. about 28° F. ($-2°$ C.).

EXAMPLE 1

The Groupe de Recherche en Ingenierie de l'Environment Atmospherique (GRIEA), The University of Quebec at Chicoutimi, maintains the only independent laboratory in North America which is approved for testing aircraft deicing and anti-icing solutions to meet U.S. AEA, ISO and SAE specifications. A discussion of the institution and its test procedures appears in Laforte, J. L., P. Louchez, G. Bouchard and F. Ma, A Facility to Evaluate Performance of Aircraft de/anti-icing Fluids Subjected to Freezing Rain, *Cold Regions Science and Technology* 18, 161–171 (1990).

A freezing rain test (The Water Spray Endurance Test (WSET)) is designed to simulate the short time exposure of aircraft to rain at below 0° C. This Water Spray Endurance Test (WSET) was conducted in the freezing rain test chamber wherein supercooled droplets of water are sprayed from an oscillating nozzle onto 10 cm × 30 cm aluminum plates which are inclined at 10 degrees to the horizontal, which plates are maintained at a temperature of $-5°$ C. The solutions being tested must possess sufficient wettability properties to spread over the plate surfaces without beading. The object is to test the ability of the composition to prevent ice formation on the surfaces of the inclined aluminum plates. Time is measured to determine the length of time required for ice forming on the top surface to grow from the bottom edge of the plate and reach a line spaced 25 mm therefrom, which is referred to as FIE (first ice event). A time period of three minutes or more is officially required for a composition to pass the WSET test.

A High Humidity Endurance Test (HHET) is designed to simulate overnight exposure of aircraft which are at below freezing temperature to air with high humidity. A film of anti-icer composition is applied onto a similar 10 cm × 30 cm aluminum plate which is maintained at $-5°$ C. in a high humidity environment. A film of anti-icing liquid is applied to the plate at a rate of about 0.3 gram per sq. decimeter per hour. Ice has a tendency to form by condensation of high humidity air on a $-5°$ C. metal surface. The High Humidity Endurance Test (HHET), per AEA, ISO and SAE specifications, requires at least 20 minutes to pass before the occurrence of any significant ice formation.

A deicer/anti-icer having the following composition was termed Sample A and was tested with the results set forth hereinafter.

Sample A
50% by weight Potassium Acetate
1000 ppm Phosphoric Acid ($H_3PO_4$)
200 ppm Sodium Silicate-($Na_2SiO_3$)

100 ppm Tolyltriazole
1000 ppm Octylphenoxypolyethoxy ethylphosphate
75 ppm Malonyl Green
Deionized Water, final pH=11

The data in Table I herebelow was reported by GRIEA for tests of Sample A. It demonstrates the excellent performance of Sample A in the Water Spray and the High Humidity Endurance Tests.

TABLE I

Climate Chamber Data Summary - Sample A

| TEST CODE | PLATE | FIE (min:sec) (1) | FLUID DATA MIE (min:sec) (2) | LIE (min:sec) (3) |
|---|---|---|---|---|
| WS-1 | 1 | 9:15 | 9:15 | 13:00 |
|  | 3 | 6:34 | 6:34 | 12:30 |
|  | 2 | 7:10 | 7:10 | 12:30 |
| WS-2 | 2 | 5:30 | 6:20 | 11:50 |
|  | 1 | 6:00 | 6:20 | 12:00 |
|  | 3 | 6:10 | 6:30 | 12:00 |
| HH-1 | 1 | 60:00 | 60:00 | 72:00 |
|  | 3 | 45:00 | 45:00 | 74:00 |
|  | 2 | 40:00 | 40:00 | 80:00 |
| HH-2 | 2 | 66:10 | 66:10 | 83:00 |
|  | 1 | 42:40 | 44:30 | 78:00 |
|  | 3 | 41:30 | 44:00 | 78:00 |

(1) First Ice Event: Time for the ice to reach first 25 mm in length
(2) Mean Icing Event: Time for the ice to reach a mean length of 25 mm
(3) Last Ice Event: Time required for complete covering of the plate To meet a second criterion required by the AEA, ISO and SAE, an anti-icer must pass the Boundary Layer Displacement Thickness (BLDT) test which is designed to measure the effect an anti-icer composition has upon aerodynamics. The test is performed at a series of temperatures from 0° C. to −25° C. in a cold wind tunnel also located at GRIEA at the University of Quebec at Chicoutimi. An anti-icing fluid is acceptable if no more than 10% of each BLDT measurement exceeds by no more than 10% the acceptance criterion boundary layer displacement thickness envelope. The test results are set forth in Table II.

uct is considered particularly valuable for use in commercial airports and military bases.

EXAMPLE 2

Another sample of a deicer/anti-icer composition having various features of the invention is formulated as Sample B hereinafter:
Sample B
50% by weight Potassium Acetate
1000 ppm Phosphoric Acid ($H_3PO_4$)
200 ppm Sodium Silicate ($Na_2SiO_3$)
100 ppm Tolyltriazole
1000 ppm Octylphenoxypolyethoxyethylphosphate
7 ppm FD&C Yellow #5
0.8 ppm FD&C Blue #1
Deionized Water (remainder)
Final pH=11

Sample B is tested using the same WSET, HHET and BLDT procedures as set forth in Example 1. Sample B is considered to similarly meet FAA requirements as an aircraft deicer/anti-icer.

EXAMPLE 3

A further sample of a deicer/anti-icer composition having various features of the invention is formulated as Sample C hereinafter:
Sample C
55% by weight Potassium Acetate
1200 ppm Phosphoric Acid ($H_3PO_4$)
220 ppm Sodium Silicate ($Na_2SiO_3$)
700 ppm Tolyltriazole
1200 ppm Octylphenoxypolyethoxyethylphosphate
8 ppm FD&C Yellow #5
1 ppm FD&C Blue #1
Deionized Water (remainder)
Final pH=11

Sample C is tested using the same WSET, HHET and BLDT procedures as set forth in Example 1. Sample C is considered to similarly meet FAA requirements as an aircraft deicer/anti-icer.

TABLE II

Aerodynamic Performance Test Data

| FLUID | TEST CODE | $T_A$ °C. | $T_F$ °C. | RH % | t* μM | Elimination % | Water gain | V at 30 sec m/s | Δ* mm |
|---|---|---|---|---|---|---|---|---|---|
| Sample A | FP-403 | −0.1 | −0.4 | 78.2 | 32 | 98 | +23.0 | 66.4 | 3.40 |
|  | FP-404 | −0.6 | −0.3 | 76.2 | 38 | 98 | +22.8 | 66.1 | 3.31 |
|  | FP-405 | −3.3 | −1.6 | 74.2 | 38 | 98 | +21.1 | 65.1 | 3.50 |
| Sample A | FP-409 | −9.5 | −8.4 | 75.3 | 51 | 97 | +13.0 | 66.5 | 3.50 |
|  | FP-410 | −10.7 | −9.3 | 73.0 | 63 | 97 | +13.2 | 66.1 | 3.49 |
|  | FP-411 | −12.7 | −10.9 | 68.8 | 57 | 97 | +12.3 | 66.4 | 3.52 |
| Sample A | FP-415 | −21.9 | −19.3 | 56.4 | 76 | 96 | +3.4 | 66.5 | 3.76 |
|  | FP-416 | −21.3 | −18.7 | 59.0 | 89 | 95 | +3.9 | 66.9 | 3.69 |
|  | FP-417 | −22.5 | −18.4 | 54.4 | 102 | 95 | +2.5 | 66.7 | 3.73 |
| Sample A | FP-421 | 26.3 | −23.5 | 54.3 | 83 | 96 | +2.1 | 67.0 | 4.04 |
|  | FP-422 | −25.6 | −23.2 | 57.3 | 70 | 96 | +2.1 | 66.8 | 3.97 |
|  | FP-423 | −26.0 | −23.9 | 55.5 | 70 | 96 | +2.8 | 66.9 | 3.98 | t* = Thickness of the fluid measured after the elimination test.
Δ* = BLDT
$T_A$ = Air Temperature
Rh = Relative humidity The GRIEA reported that the Sample A composition exhibiting the performance set forth in Table II also clearly demonstrates acceptable aerodynamic performance in the critical temperature range of between 0° C. and −25° C.

Sample A easily meets the specifications of the Federal Aeronautics Administration (FAA), AEA, ISO and SAE, as well as the United States Air Force interim specifications for aircraft deicing. As a result, this prod- The compositions of the present invention may advantageously be shipped in bulk, using tank trucks, railway tank cars, mini-bulk containers, steel drums and the like. Because these compositions are nonhazardous, they may be stored in containers made of polyethylene, stainless steel, lacquer-lined mild steel, or glass. They would be typically applied by spraying the liquid onto the fuselage, wings, and tail structures, from a tank truck or the like, i.e. in the same general manner as glycol-based anti-icers are presently applied in commercial aviation operations.

In addition to exhibiting the ability to pass FAA performance tests and having very favorable environmental properties, as discussed above, a composition embodying this combination of acetate, phosphate, silicate, aromatic triazole, surfactant, and dye is has excellent properties as an inhibitor of metal corrosion and thus fully qualifies from this aspect.

Although the compositions of the present invention have been described with reference to the presently-preferred embodiments, it is understood that various modifications can be made without departing from the scope of the invention which is limited only by the following claims. Particular features of the invention are emphasized in the claims which follow.

What is claimed is:

1. A liquid deicer/anti-icer composition for the exterior of aircraft, which composition comprises
   an aqueous solution having a pH of between about 10 and about 12, which solution contains
   between about 40% and about 60% by weight of an alkali metal acetate,
   at least about 800 ppm of phosphate ion,
   at least about 150 ppm of silicate
   at least about 100 ppm of an aromatic triazole,
   between about 500 ppm and about 1500 ppm of a water-soluble surfactant, which is an alkyl aryl alkoxy phosphate ester and which reduces the surface tension of said aqueous solution to below about 50 dynes/sq. cm. and prevents aggregation of the remaining components in said solution, and
   at least 5 ppm of a water-soluble dye.

2. The composition of claim 1 wherein said alkali metal acetate is potassium acetate.

3. The composition of claim 1 wherein said surfactant is octylphenoxypolyethoxy ethylphosphate.

4. The composition of claim 1 wherein said phosphate ion is from phosphoric acid.

5. The composition of claim 1 wherein said phosphate ion is from $K_3PO_4$.

6. The composition of claim 1 wherein said silicate ion is from an alkali metal silicate.

7. The composition of claim 5 wherein said silicate ion is from sodium silicate, $Na_2SiO_3$.

8. The composition of claim 5 wherein said silicate ion is from potassium silicate, $K_2SiO_3$.

9. The composition of claim 1 wherein said aromatic triazole is tolyltriazole.

10. The composition of claim 1 wherein said dye is a mixture of blue and yellow approved food dyes which provide a visible green hue.

11. The composition of claim 1 wherein said alkali metal acetate is potassium acetate, said phosphate ion is provided by $H_3PO_4$, said silicate ion is provided by sodium silicate ($Na_2SiO_3$), said aromatic triazole is tolyltriazole and said surfactant is octylphenoxy polyethoxy ethylphosphate.

12. The composition of claim 11 which is formed of about 50 weight percent potassium acetate, about 1000 ppm $H_3PO_4$, about 200 ppm $Na_2SiO_3$, about 100 ppm tolyltriazole and about 1000 ppm octylphenoxypolyethoxy ethylphosphate.

13. A method of deicing or anti-icing aircraft by applying an effective amount of a deicing or anti-icing composition to exterior surfaces of said aircraft, which composition comprises an aqueous solution having a pH of between about 10 and about 12 and containing
   between about 40% and about 60% by weight of an alkali metal acetate,
   at least about 800 ppm of phosphate ion,
   at least about 150 ppm of silicate
   at least about 100 ppm of an aromatic triazole,
   between about 500 ppm and about 1500 ppm of a water-soluble surfactant, which is an alkyl aryl alkoxy phosphate ester and which reduces the surface tension of said aqueous solution to below about 50 dynes/sq. cm. and prevents aggregation of the remaining components in said solution, and
   at least 5 ppm of a water-soluble dye which gives said composition a visible hue.

14. The method of claim 13 wherein said alkali metal acetate is potassium acetate, said phosphate ion is provided by phosphoric acid, said silicate ion is provided by sodium silicate ($Na_2SiO_3$), said aromatic triazole is tolyltriazole and said surfactant is octylphenoxypolyethoxy ethylphosphate.

15. The method of claim 14 wherein said composition contains about 50% by weight potassium acetate, about 1000 ppm $H_3PO_4$, about 200 ppm $Na_2SiO_3$, about 100 ppm tolyltriazole, and about 1000 ppm octylphenoxy polyethoxy ethylphosphate.

* * * * *

UNITED STATES PATENT AND TRADEMARK OFFICE
CERTIFICATE OF CORRECTION

PATENT NO. : 5,435,930
DATED : July 25, 1995
INVENTOR(S) : Chan, et al.

It is certified that error appears in the above-indentified patent and that said Letters Patent is hereby corrected as shown below:

IN THE CLAIMS: Column 9 (claim 1), line 27, after "silicate", insert --ion,--; Column 10 (claim 13), line 27, after "silicate", insert --ion,--.

Signed and Sealed this

Thirty-first Day of October 1995

Attest:

BRUCE LEHMAN

Attesting Officer     Commissioner of Patents and Trademarks